United States Patent
Fechtel

(10) Patent No.: US 8,014,268 B2
(45) Date of Patent: Sep. 6, 2011

(54) OFDM TRANSMISSION METHOD, WHICH IS INTENDED BOTH FOR SPORADIC AND FOR CONTINUOUS DATA COMMUNICATION, FOR A WLAN

(75) Inventor: Stefan Fechtel, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 992 days.

(21) Appl. No.: 11/265,003

(22) Filed: Nov. 2, 2005

(65) Prior Publication Data

US 2006/0109780 A1    May 25, 2006

(30) Foreign Application Priority Data

Nov. 2, 2004 (DE) .......................... 10 2004 052 899

(51) Int. Cl.
*H04J 11/00* (2006.01)
(52) U.S. Cl. ......................... 370/208; 375/260
(58) Field of Classification Search .................. 370/203, 370/208–210; 375/260, 267, 299, 347
See application file for complete search history.

(56) References Cited

U.S. PATENT DOCUMENTS

| | | | | |
|---|---|---|---|---|
| 6,298,098 B1 * | 10/2001 | Krasner et al. | ................. | 375/317 |
| 2002/0181509 A1 * | 12/2002 | Mody et al. | .................... | 370/480 |
| 2002/0191682 A1 * | 12/2002 | Moon | ........................... | 375/147 |
| 2003/0072255 A1 | 4/2003 | Ma et al. | ........................ | 370/208 |
| 2006/0014494 A1 * | 1/2006 | Vanderperren et al. | ...... | 455/63.1 |
| 2006/0093078 A1 * | 5/2006 | Lewis et al. | ................... | 375/343 |
| 2008/0039107 A1 * | 2/2008 | Ma et al. | ....................... | 455/450 |

FOREIGN PATENT DOCUMENTS

| | | |
|---|---|---|
| CN | 1407745 | 4/2003 |
| DE | 10005287 | 2/2000 |
| DE | 10210656 | 3/2002 |
| EP | 1389861 | 8/2002 |

OTHER PUBLICATIONS

IEEE 802.11A-1999 Supplement to IEEE Standard for information Technology Sep. 16, 1999.*
Fechtel et al., Improved Frame Synchronization for Spontaneous Packet Tranmsission over Frequency-Selective Radio Channels, Proceedings IEEE Int. Conf. On Personal, Indoor and Mobile Comm. 1994, pp. 353-357.
Schmidt et al., "Channel Tracking in Wireless OFDM Systems," SCI 2001, 5 pages.
IEEE 802.11A-1999, "Supplement to IEEE Standard for Information Technology," High-Speed Physical Layer in the 5 GHz Band, pp. 12-14, Sep. 16, 1999.
Tim Hentschel, "Wireless Gigabit with Advance Multimedia Support (WIGWAM)," pp. 3-27, Jun. 20, 2003.

(Continued)

*Primary Examiner* — Dady Chery
(74) *Attorney, Agent, or Firm* — Coats & Bennett, P.L.L.C.

(57) ABSTRACT

In an OFDM-based transmission method it can be stated for the preamble (4, 7) of a data packet that its N preamble segments (B, $\overline{B}$) are obtained from the segment-by-segment multiplication of an initial segment, which is fixed for all N preamble segments, by a multiplication sequence with a length of N elements. It can be stated for the OFDM data symbols that a plurality of OFDM symbols which are transmitted successively in time each include at least one pilot signal, with the respective subcarrier which transmits the at least one pilot signal being dependent on the time index of the respective OFDM symbol.

11 Claims, 4 Drawing Sheets

OTHER PUBLICATIONS

Myers et al., "Design Considerations for Minimal-Power Wireless Spread Spectrum Circuits and Systems," Proceedings of the IEEE, vol. 88, No. 10, Oct. 2000, pp. 1598-1612.

Drilo et al., Comparison of IEEE 802.11g Optional Standard Elements in WLAN HotSpot Scenario, 17th International Conference on Applied Electromagnetics and Communications, pp. 147-151, Oct. 1, 2003.

ETSI EN 300 744, "Digital Video Broadcasting (DVB); Framing structure, channel coding and modulation for digital terrestrial television," European Broadcasting Union, v1.5.1, pp. 2-64, Jun. 2004.

* cited by examiner

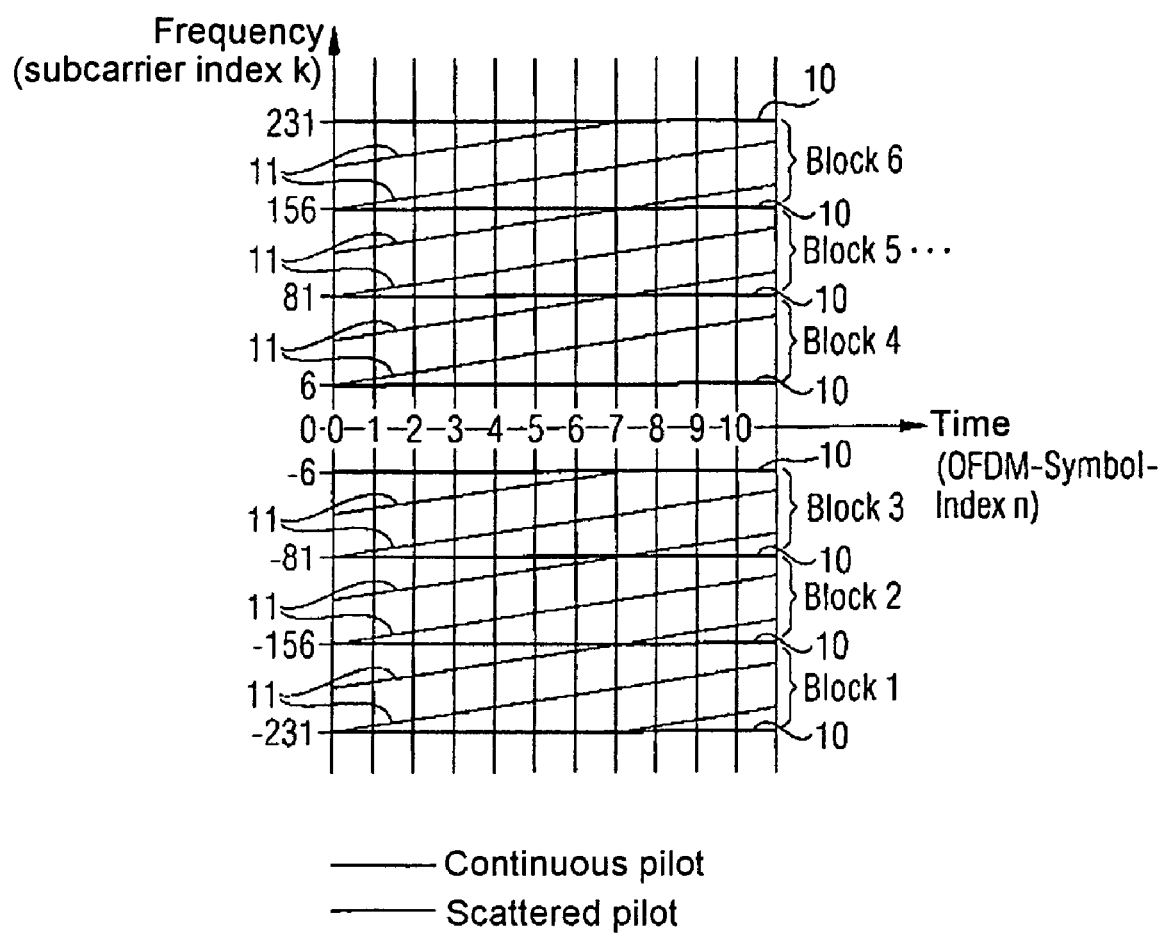

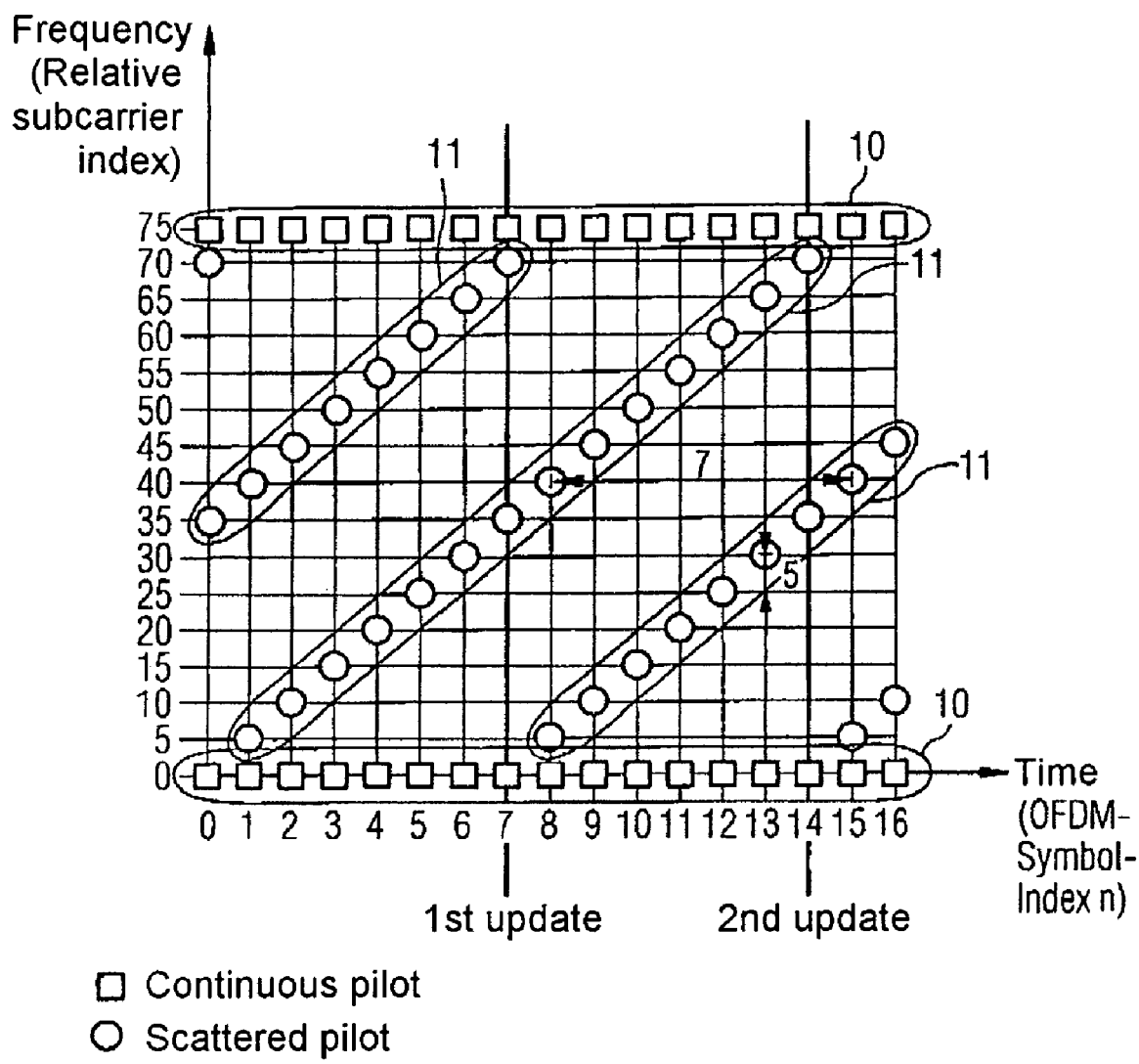

us 8,014,268 B2

OFDM TRANSMISSION METHOD, WHICH IS INTENDED BOTH FOR SPORADIC AND FOR CONTINUOUS DATA COMMUNICATION, FOR A WLAN

CROSS-REFERENCE TO RELATED APPLICATIONS

This application claims priority from German Patent Application No. 10 2004 052 899.3, which was filed on Nov. 2, 2004, and is incorporated herein by reference in its entirety.

Technical Field

The invention relates to a packet-oriented, OFDM-based (orthogonal frequency division multiplex) transmission method for a WLAN (wireless local area network).

Background

In OFDM transmission systems, the transmission band is subdivided into a number $k_{max}$ of subcarriers, with each subcarrier being occupied individually with modulation, in general either PSK (phase shift keying) or QAM (quadrature amplitude modulation). An OFDM symbol is obtained as the resultant vector of the modulation on the individual subcarriers. In the transmitter, the OFDM symbol (which is effectively in the frequency domain) is transformed by means of a fast inverse fourier transformation, also referred to as IFFT, based on the $k_{max}$ subcarriers in the time domain. In the receiver, $k_{max}$ or more time signal sample values of a received OFDM symbol are transformed to the frequency domain again by means of a fast fourier transform, also referred to as an FFT, and are demodulated there (PSK or QAM demodulation).

One known OFDM transmission standard is the WLAN Standard IEEE-802.11a. In this Standard, an OFDM symbol is divided into $k_{max}$=52 subcarriers, with 48 fixed subcarriers being used for transmission of data information, and 4 fixed subcarriers being used for transmission of pilot information. An OFDM symbol in this case comprises 48 QAM data symbols and 4 PSK pilot symbols. Data transmission rates of up to 54 Mb/s are achieved using the WLAN Standard IEEE-802.11a.

A fundamental distinction is drawn between two different types of data communication for the data communication that occurs in a WLAN:

1. Sporadic Data Communication

In the case of sporadic data communication, data is interchanged only occasionally. One typical example of sporadic data communication is communication using the Internet Protocol. In this case, the user acts or reacts at certain time intervals, so that data is interchanged only occasionally, rather than continuously. One typical feature of data communication such as this is a relatively short packet length. When the packet lengths are short, the packet synchronization, also referred to as burst synchronization, is problematic since only a short time period is available for synchronization. Aspect elements of burst synchronization are burst detection, gain setting, antenna switching for antenna diversity, rough frequency synchronization, frame synchronization, symbol synchronization and initial channel estimation. Burst synchronization is based on the evaluation of a packet preamble, which precedes the actual payload data in the packet. Since packet preambles which are as short as possible are used in order to ensure the maximum possible transmission efficiency for short packet lengths, the burst synchronization must be completed very quickly within the short packet preamble.

2. Continuous Data Communication, in Particular Streaming

In the case of continuous data communication, data is transmitted continuously from a data source to a data sink. One typical example of continuous data communication is the streaming of audio and/or video data transmitted for digital broadcast radio (DAB, DVB-T). In order to ensure high transmission efficiency when streaming audio and/or video data, the data packets which are used for continuous data communication are in general very long in comparison to those used for sporadic data communication. If the data packets are very long, this results in the requirement for both the frequency synchronization and the channel estimation to be continuously updated in order to prevent desynchronization of data communication during a long data packet. This is because the frequency drifts over time, and the channel parameters vary continuously owing to the time invariance of the channel. Continuous updating of the frequency synchronization and channel estimation during transmission of the payload data of a data packet is also referred to as frequency tracking or channel tracking.

FIG. 1 illustrates the format of the packet preamble for the WLAN Standard IEEE-802.11a that has already been mentioned above. The definition of the packet preamble is taken from the Standard document for IEEE-802.11a-1999, "Part 11: Wireless LAN Medium Access Control (MAC) and Physical Layer (PHY) Specifications: High-Speed Physical Layer in the 5 GHz Band", Sep. 16, 1999.

The preamble comprises a first part 1, which can be subdivided into 10 periodic segments B, also referred to as B segments. The identical segments B are short OFDM training symbols, which relate to only 12 subcarriers of the total of 52 subcarriers. OFDM symbols such as these form the basis for a plurality of sample values, represented in the time domain (that is to say after the IFFT). Owing to the smaller number of subcarriers, the time duration of the short OFDM training symbols B at 0.8 µs is considerably shorter than the time duration of 4.0 µs of an OFDM symbol covering all 52 subcarriers (the time duration of 4.0 µs itself includes a so-called guard time of 0.8 µs). The periodically repeating OFDM training symbols B are used for rough frequency synchronization, burst detection and reception amplifier gain setting.

Furthermore, the preamble comprises a second part 2, which includes two periodic segments C. These preamble segments, which are referred to as C segments, are long OFDM training symbols which use all of the 52 subcarriers and thus each have a time duration of 3.2 µs. The major purpose of the long OFDM training symbols is the initial estimation of the channel parameters.

In addition, a guard interval CP with a time duration of 1.6 µs is provided between the short OFDM training symbols B in the first part 1 of the preamble and the long OFDM training symbols C in the second part 2 of the preamble. After the long OFDM training symbols C, an OFDM preamble symbol signal is transmitted, which contains information about the data rate and the length of the subsequent data payload 3 in the packet.

Since the receiver is not ready to receive until after the duration of a number of B segments owing to the need to carry out burst detection and the need to set the gain, it does not know the precise position of a short OFDM training symbol B within the 10 B-segment long chain. The first part 1 of the preamble is therefore not suitable for frame synchronization. Instead of this, frame synchronization is carried out on the basis of the transition between the first part 1 of the preamble and the second part 2 of the preamble, which describes a uniquely defined time within the data packet. This type of frame synchronization has the disadvantage that it is carried out relatively late within the preamble. If the entire process of frame synchronization cannot be completed in its entirety within the second part 2 of the preamble, data reception of the first OFDM data symbols within the data payload 3 is adversely affected. For sporadic data communication with a relatively short packet length, this means that a relatively large proportion of the data payload 3 may be disturbed, so that it becomes necessary to re-transmit the relevant data packet. Furthermore, the frame synchronization is relatively inaccurate, since the autocorrelation function has a relatively flat profile.

The document "Improved Frame Synchronisation for Spontaneous Packet Transmission over Frequency-Selective Radio Channels", by S. Fechtel et al., Proceedings IEEE Int. Conf. on Personal, Indoor and Mobile Radio Comm., PIMR 1994, pages 353 to 357, The Hague, Netherlands, 1994, discloses a preamble format which is based on periodic segments, similar to the B segments, but has improved frame synchronization characteristics. The preamble as described in the cited document is obtained from segment-by-segment multiplication of a fixed initial segment, for example the B segment, by a mathematical sign sequence, whose elements either have the value +1 or the value -1. This preamble has considerably better autocorrelation characteristics than a preamble composed of periodic identical segments. This allows rapid and precise frame synchronization.

As has already been explained above, only 4 subcarriers of the total of $k_{max}$=52 subcarriers in the WLAN Standard 802.11a are intended for transmission of continuous pilot information. FIG. 2 shows the occupancy of the 52 subcarriers with the subcarrier index from -26 to +26 (the subcarrier with the index 0 at 0 Hz is not used). The pilot signals $P_{-21}$, $P_{-7}$, $P_7$ and $P_{21}$ are transmitted on the subcarriers with the indices -21, 7, 7 and 21, respectively, with each pilot signal corresponding to one PSK pilot symbol in each time step.

If pilot signals which are already known in the receiver are used for synchronization or for tracking, this is referred to as data-aided (DA) synchronization or data-aided (DA) tracking. If the synchronization or the tracking is based on the evaluation of data signals which are initially unknown in the receiver, this is in contrast referred to as decision-directed (DD) synchronization or decision-directed (DD) tracking.

In the WLAN Standard IEEE-802.11a, the pilot information on the 4 subcarriers is sufficient for continuous frequency tracking, so that the frequency tracking can be carried out as a completely DA-based frequency tracking process. Owing to the fact that the 4 subcarriers of the pilot signals are relatively far apart from one another in the frequency domain, sufficiently accurate continuous DA-based estimation of the channel parameters (channel tracking) is not possible for all of the subcarriers of an OFDM data symbol on the basis of these pilot signals. For this reason, the channel tracking is implemented as DD-based channel tracking in IEEE-802.11a-conformal receivers, that is to say the data information is used rather than the pilot information for channel tracking. One disadvantage of a DD-based implementation is, however, that demodulated and decided QAM data symbols are initially modulated onto the individual subcarriers once again at the receiver end, and may also have to be coded again. This process must in this case be repeated in the course of the averaging process for a plurality of OFDM symbols. In this case, it can be stated that the delay related to this and the complexity of the implementation are related to the accuracy of the channel tracking, that is to say the better the channel tracking accuracy, the greater is the implementation complexity and the greater the time delay, as well. For continuous data communication with long packets, in which sufficiently accurately acting channel tracking is essential, this means that the channel tracking can be implemented only with a very high degree of implementation complexity with the aid of the DD-based approach. For more detailed understanding of DD-based channel tracking, reference should be made to the publication "Channel Tracking in Wireless OFDM Systems" by H. Schmidt et al., SCI 2001, Orlando, Fla., 2001.

Section 4.5.3 of the DVB Standard document ETSI EN 300744, "Digital Video Broadcasting (DVB): Framing Structure, Channel Coding and Modulation for Digital Terrestrial Television", European Standard, V1.4.1, 2001, describes the provision of additional scattered pilot signals—which are also referred to as scattered pilots—on fixed subcarriers, in addition to continuous pilot signals, in which case the subcarrier of a scattered pilot such as this changes from one OFDM symbol to the next. Effectively, a pilot signal which is scattered in this way moves over time over a large number of different subcarriers. This measure allows the pilot signals to cover a large number of subcarriers without this noticeably reducing the useful data rate.

The definition of a new OFDM-based WLAN Standard for the next generation is currently being worked on in the WIGWAM (Wireless Gigabit with Advanced Multimedia Support) research project, which is based on the previous WLAN Standard IEEE-802.11a, but has a considerably higher data transmission rate than the previous Standard IEEE-802.11a. The aim in this case is to achieve data transmission rates in the order of magnitude of up to 1 Gb/s. Various frequency bands between 5 GHz and 60 GHz are provided for radio transmission. Each frequency band has a width of approximately 500 MHz and allows the transmission of a plurality of OFDM channels. Particularly powerful terminals could also bundle a plurality of OFDM channels, which would make it possible to even increase the data transmission rate to several Gb/s. In addition to the increased data rate, one significant feature of this future WLAN Standard is that the Standard offers an improvement over the already existing WLAN Standard both for sporadic data communication and for streaming of video and audio data.

Summary

Building on the WLAN Standard 802.11a, one object of the invention is to specify a packet-oriented OFDM transmission method for a WLAN which is appropriate both for sporadic data communication, in which short data packets occur, and for continuous data communication, in which the data packets are very long, in the form of a single transmission method. An OFDM transmission method such as this could form the basis of a new OFDM-based WLAN Standard for the next generation.

This object can be achieved for example by a packet-oriented transmission method for a wireless local area network (WLAN) comprising the step of transmitting orthogonal frequency division multiplex (OFDM) symbols on a plurality of subcarriers wherein one data signal or one pilot signal is transmitted per subcarrier, a packet for frame synchronization comprises a preamble with N preamble segments and a plurality of sample values are based on each of the N preamble segments, respectively, and the N preamble segments are obtained from a segment-by-segment product of an initial segment, which is fixed for all N preamble segments, and a non-constant multiplication sequence with a length of N elements, and a plurality of OFDM symbols are transmitted successively in time and each have a time index and each include at least one pilot signal for channel estimation, and the respective subcarrier which transmits the at least one pilot signal is dependent on the time index of the respective OFDM symbol.

The individual elements of the multiplication sequence each may have either the value −1 or the value +1. A Barker sequence, preferably of a length 13, is based on the preamble as the multiplication sequence. The multiplication sequence on which the preamble is based may comprise a sequence element which includes only elements with the value +1, and a Barker sequence, in which an end section of the sequence element, which comprises a plurality of elements, at the same time forms an initial section of the Barker sequence. The sequence element may comprise 10 elements, and an end section of the sequence element with a length of 5 elements at the same time may form the initial section, with a length of 5 elements, of the Barker sequence of length 13. A plurality of immediately successive OFDM symbols in time each may include the at least one pilot signal, with the index of the respective subcarrier which transmits the pilot signal increasing or decreasing linearly with the increasing time index of the respective OFDM symbol. The index of the subcarrier which in each case transmits the at least one pilot signal may increase or decrease by 5 subcarriers per OFDM symbol as the time index of the respective OFDM symbol increases. Two OFDM symbols whose time indices differ by a fixed number of time steps, in particular by 7 time steps, each may include the at least one pilot signal on a specific identical subcarrier. A new channel estimate can be carried out jointly for all the subcarriers in each case after a fixed number of time steps, with the pilot signals of the OFDM symbols being temporarily stored between two channel estimates. The data rate of the data transmission can be an integer multiple of a data rate from the WLAN Standard IEEE-802.11a. An OFDM symbol may comprise a total of 432 subcarriers for transmission of data signals, with the OFDM symbol rate being 1/(3.6 µs).

In the packet-oriented transmission method according to the invention for a WLAN, OFDM symbols are transmitted on a plurality of subcarriers. In this case one subcarrier comprises a data signal or a pilot signal.

The transmission method according to the invention is based on two aspect elements in order to achieve the object:

The first aspect element relates to the definition of the preamble for frame synchronization. The packet preamble according to the invention comprises N preamble segments. A plurality of sample values, which are in general different, are in each case based on each of the N preamble segments. One preamble segment preferably corresponds to one OFDM preamble symbol; however, this is not essential, that is to say it is possible to use preamble segments with any desired sample values. Each of the N preamble segments is obtained from the segment-by-segment multiplication of an initial segment, which is fixed for all N preamble segments, by a non-constant multiplication sequence, with a length of N elements. The multiplication sequence is, for example, a mathematical sign sequence, whose elements have either the value +1 or the value −1. The multiplication sequence should have good autocorrelation characteristics, that is to say the autocorrelation function of the multiplication sequence should have a relatively high value for 0 and relative small precursors and successors around 0. The good autocorrelation characteristics of the multiplication sequence are in this case transferred to the autocorrelation characteristics of the preamble. Multiplication sequences with real-value or complex-value elements are also feasible in order to improve the autocorrelation characteristics.

The preamble according to the invention based on the first aspect element of the transmission method according to the invention allows rapid and precise frame synchronization by virtue of its autocorrelation characteristics. In particular, this improves the transmission of short data packets, which occur during sporadic data communication. The frame synchronization problem described above for short data packets does not occur with the method according to the invention.

The second aspect element relates to the definition of the OFDM data symbols with respect to the pilot information formed by the OFDM data symbols. For the OFDM data symbols, it can be stated that a plurality of OFDM symbols which are transmitted successively in time each include at least one pilot signal for channel estimation. In this case, the subcarrier which in each case transmits the at least one pilot signal is dependent on the time index of the respective OFDM symbol. This means that a pilot signal such as this changes the subcarrier from one OFDM symbol to the next in accordance with a specific predetermined pattern; this is thus a scattered pilot signal. In contrast, in the WLAN Standard 802.11a, one pilot signal always uses the same subcarrier. The at least one pilot signal changes the subcarrier in such a way that, with the aid of the at least one pilot signal, this allows sampling of the transfer function of the channel in the frequency direction, that is to say on the axis of the subcarriers, with sufficient resolution. The sample values generated in this way allow sufficiently accurate DA-based channel tracking, as is necessary for the transmission of long data packets, because the channel conditions change continuously. A plurality of pilot signals which in each case change the subcarrier are provided in one OFDM symbol.

The combination of both aspect elements of the transmission method according to the invention, that is to say a packet preamble for rapid and precise frame synchronization on the one hand and the use of distributed pilot signals for DA-based channel tracking on the other hand, results in an OFDM transmission method which is suitable not only for sporadic data communication, in which short data packets occur, but also for continuous data communication, in which the data packets are very long.

A Barker sequence is preferably used as the binary multiplication sequence for the preamble, for example the Barker sequence of length 13. The Barker sequence is distinguished by its good autocorrelation characteristics.

According to one advantageous embodiment of the transmission method according to the invention, the multiplication sequence on which the preamble is based comprises a sequence element which includes only elements with the value +1. Furthermore, the preamble also includes a Barker sequence. With regard to the multiplication sequence, it can be stated that an end section of the sequence element which comprises a plurality of elements at the same time forms an initial section of the Barker sequence, that is to say the sequence element and the Barker sequence overlap. Since the two parts of the multiplication sequence overlap, the overall multiplication sequence and hence the resultant preamble as well are shorter than if there were no overlap. The initial rough frequency synchronization is preferably carried out, inter alia, on the basis of that part of the preamble on which the constant sequence element is based, while in contrast the frame synchronization is carried out on the basis of that part of the preamble on which the Barker sequence is based.

The layout of the preamble as described above and based on a multiplication sequence comprising two overlapping parts relates only to the first aspect element of the invention. This technical teaching is also generally feasible on its own without the second aspect element of the invention. This also applies in the same way to other advantageous refinements of the method, which relate either to the first or to the second aspect element of the invention.

The at least one pilot signal in each case advantageously comprises a plurality of immediately successive OFDM symbols in time. The index of the subcarrier transmitting the respective pilot signal increases or decreases linearly as the time index of the respective OFDM symbol increases, for example with the step width being 5 subcarriers per OFDM symbol. This means that the at least one pilot signal passes through a specific frequency range during a specific time period which corresponds to the duration of the plurality of symbols. The step width per OFDM symbol in this case governs the resolution of the sampling of the channel transfer function in the frequency direction.

According to one advantageous embodiment, two OFDM symbols whose time indices differ by a fixed number of time steps, for example by 7 time steps, each include a pilot signal which changes the subcarrier on one specific identical subcarrier. The channel transfer function for a specific subcarrier can thus be sampled again repeatedly at a specific time sampling rate. This is necessary because the transmission channel is time-variant. The pilot signals must therefore be retransmitted at a specific repetition rate per subcarrier for continuous channel estimation.

The data rate of the transmission method according to the invention is preferably an integer multiple of a data rate from the WLAN Standard IEEE-802.11a. This is achieved, for example, essentially by reusing the modulation method and the coding method from the WLAN Standard 802.11a for the transmission method according to the invention. This considerably reduces the implementation complexity for terminals which support the next-generation WLAN Standard.

By way of example, one OFDM symbol in the transmission method according to the invention comprises a total of 432 subcarriers for transmission of data signals, with the OFDM symbol rate being $1/(3.6\ \mu s)$. The WLAN Standard IEEE-802.11a uses 48 subcarriers for data transmission, with the OFDM symbol rate being $1/(4.0\ \mu s)$. This results in the transmission method according to the invention having a data rate which is 10 times higher than that in the WLAN Standard IEEE-802.11a.

BRIEF DESCRIPTION OF THE DRAWINGS

The invention will be explained in more detail in the following text using one exemplary embodiment and with reference to the drawings, in which:

FIG. 1 shows an illustration of the packet preamble for the WLAN Standard IEEE-802.11a;

FIG. 2 shows an illustration of the occupancy of 4 of the total of 52 subcarriers for an OFDM symbol with pilot signals for the WLAN Standard IEEE-802.11a;

FIG. 4 shows an illustration of the occupancy of the subcarriers with pilot signals for one exemplary embodiment of the transmission method according to the invention; and FIG. 5 shows an illustration of the occupancy of some of the subcarriers with pilot signals for one exemplary embodiment of the transmission method according to the invention.

DETAILED DESCRIPTION

Figure 1:
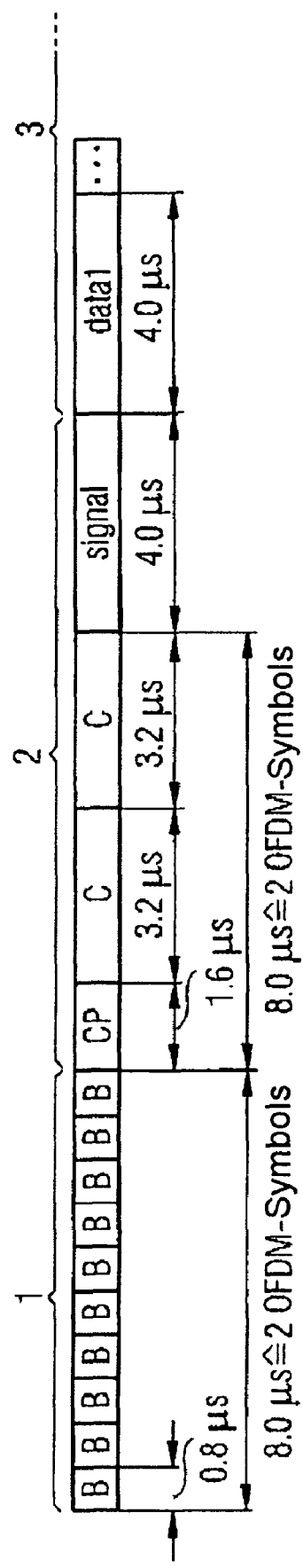
Figure 2:
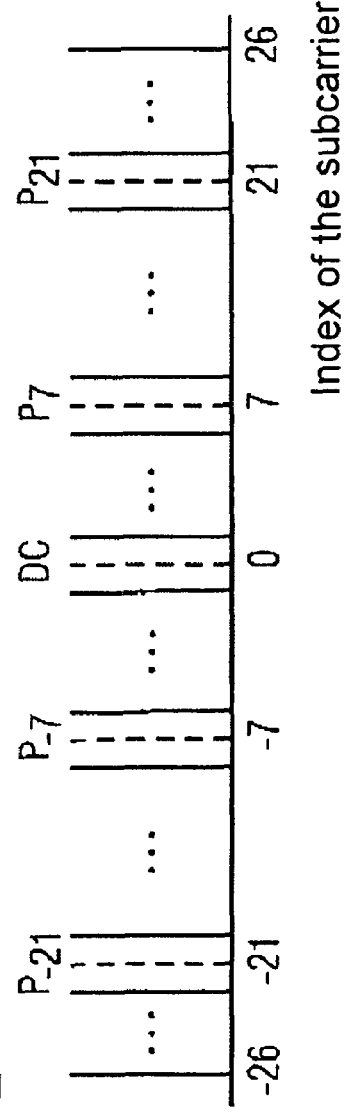

FIGS. 1 and 2 have already been explained above, with reference to the prior art.

Figure 3:
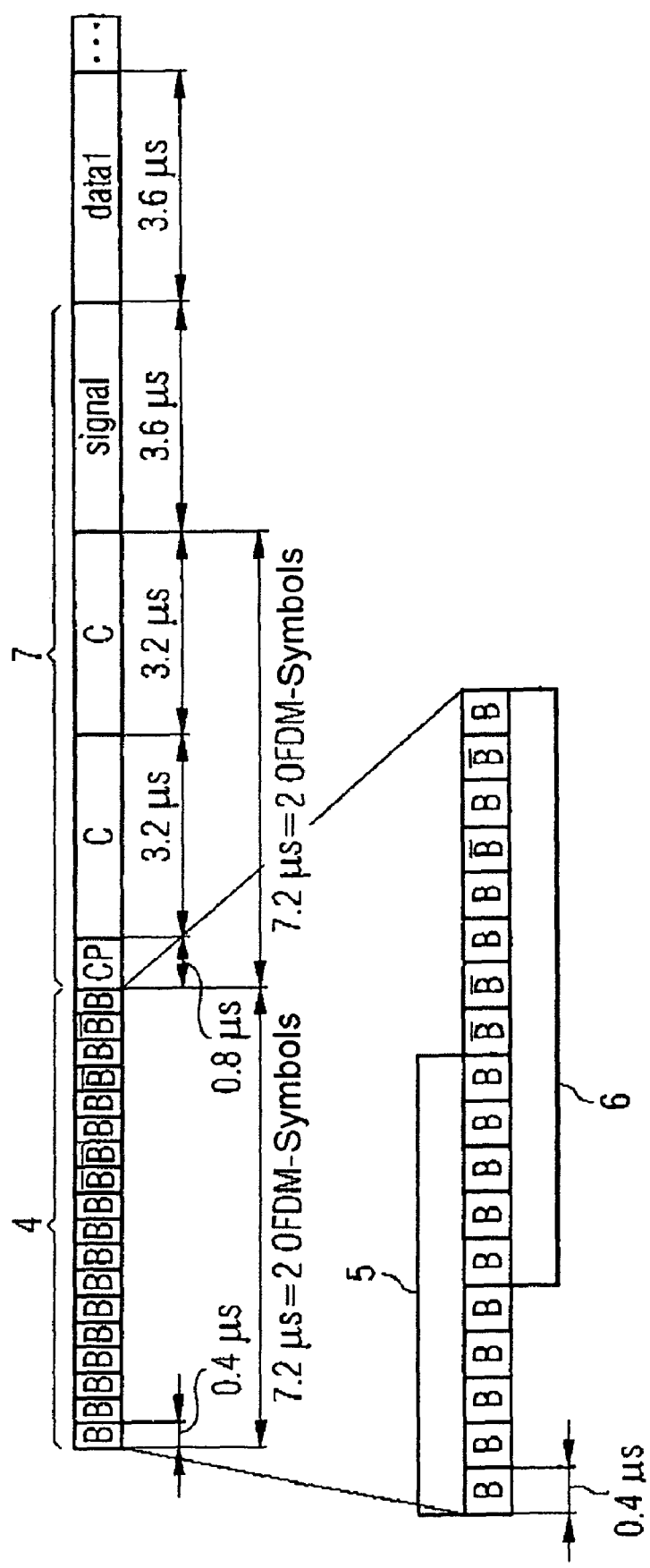
FIG. 3 shows an illustration of a packet preamble for one exemplary embodiment of the transmission method according to the invention.

FIG. 3 illustrates a packet preamble based on the exemplary embodiment of the transmission method according to the invention as described in the following text. The preamble is based on the preamble illustrated in FIG. 1 for the WLAN Standard IEEE-802.11a. The packet preamble comprises a first part 4 with short segments (time duration 0.4 µs) and a second part 7 with two longer segments. (time duration 3.2 µs). The first part 4 of the packet preamble contains N=18 short segments. The segments, which are annotated B or $\overline{B}$ each comprise a plurality of sample values. The first part 4 of the preamble comprises a first section 5 and a second section 6. The total of 10 segments in the first section 5 are in this case identical. The first section 5 in consequence behaves in the same way as the first part 1 of the preamble for the WLAN Standard IEEE-802.11a (see FIG. 1). The segments of the second section 6, which overlaps the first section 5, are not completely identical, in contrast to the first section 5. The bars in this case indicate the inversion of the individual sample values in the B segment.

The first part 4 of the packet preamble is obtained from the superimposition of a sequence B'=[B, B, . . . , B, B] of identical segments B and a mathematical sign sequence $S=[s_1, s_2 \ldots, s_{N-1}, s_N]$ where $s_i=\{+1, -1\}$. The first part 4 of the packet preamble can thus be represented in the form: $[s_1 \cdot B, s_2 \cdot B, \ldots, s_{N-1} \cdot B, s_N \cdot B]$.

A mathematical sign sequence $S=[1, 1, 1, 1, 1, 1, 1, 1, 1, 1, -1, -1, 1, 1, -1, 1, -1, 1]$ is used in the present case. The first 10 elements, on which the first section 5 is based, are each set to 1, while the last 13 elements in the mathematical sign sequence form a Barker sequence of length 13.

The first section 5, which is very similar to the first part 1 of the preamble in the WLAN Standard IEEE-802.11a, allows reuse of synchronization algorithms which are already known from the WLAN Standard IEEE-802.11a. These synchronization algorithms relate to burst detection, gain setting, antenna switching for antenna diversity, and rough frequency synchronization.

Frame synchronization can be carried out on the basis of the second section 6, which is based on the Barker sequence of line 13. Frame synchronization based on the second section 6 is in this case considerably more powerful than the frame synchronization process as known from the WLAN Standard 802.11a, which is based on detection of the transition between the first section 1 and the second section 2 (see FIG. 1). This on the one hand affects the accuracy of the frame synchronization which, owing to the high value of the autocorrelation function for 0, is considerably greater than in the case of the approach that is known from the prior art. Furthermore, the frame synchronization process is also completed early in time within the preamble, that is to say the approach according to the invention allows frame synchronization to be completed even before the second part of the preamble.

FIG. 4 illustrates the occupancy of the subcarriers with pilot signals for one exemplary embodiment of the transmission method according to the invention. Each OFDM data symbol is transmitted on a plurality $k_{max}$ of subcarriers. Each subcarrier is in this case occupied by a PSK-modulated pilot symbol or by a QAM-modulated data symbol. The OFDM data symbol format is governed by the two-dimensional arrangement of PSK pilot symbols p(n, k) and QAM data symbols a(n, k), where n denotes the OFDM symbol index (time direction) and k the subcarrier index (frequency direction).

The OFDM transmission method uses a total of $k_{max}=2\times 226=452$ subcarriers, with the interval between adjacent subcarriers being 312.5 kHz, as in the WLAN Standard IEEE-802.11a. The $k_{max}=452$ subcarriers are subdivided into 6 blocks of 74 subcarriers each, and occupy a frequency range of 144.4 MHz, with the bandwidth of the overall channel being 160 MHz. The bandwidth of the overall channel in this case corresponds to the sampling rate for OFDM modulation and demodulation. An IFFT or FFT with 512 points is carried out for OFDM modulation and OFDM demodulation, respectively, with the number of points being greater by a factor of 8 than in the case of the WLAN Standard 802.11a. The centre of the frequency spectrum, that is to say the frequency range between the subcarriers with the indices −6 and +6, is not used for data transmission. This makes it easier to produce the receiver in the form of a direct conversion receiver.

The symbol duration of an OFDM symbol without a guard interval is 512/(160 MHz)=3.2 μs. This time period is identical to the symbol duration of an OFDM symbol without a guard interval in the WLAN Standard IEEE-802.11a. The length of the guard interval is 0.4 μs. This time period is 0.8 μs in the WLAN Standard IEEE-802.11a. The overall symbol duration of an OFDM symbol with a guard interval is thus 3.6 μs (in this context, see also FIG. 3), that is to say 9/10 of the overall symbol duration of 4.0 μs in the WLAN Standard IEEE-802.11a.

Of the total of $k_{max}$=452 subcarriers, 432 are used for transmission of QAM data symbols. In comparison to the WLAN Standard IEEE-802.11a, which occupies only 48 subcarriers (that is to say 1/9 of the subcarriers in comparison to the transmission method according to invention) with QAM data symbols for an overall OFDM symbol time duration of 4.0 μs (that is to say 10/9 of the overall OFDM symbol time duration in comparison to the transmission method according to the invention), the achievable data rates are thus higher by a factor of 10, that is to say 60 Mb/s to 540 Mb/s in comparison to 6 Mb/s to 54 Mb/s with the WLAN Standard IEEE-802.11a.

The 20 remaining subcarriers per OFDM symbol which are not used for data transmission are used for transmission of pilot information. As can be seen from FIG. 4, 8 continuous pilots 10 are provided, which each occupy one subcarrier per OFDM symbol and whose subcarrier index remains the same for OFDM symbols which follow one another in time. These continuous pilots 10 are used for frequency tracking. Furthermore, a total of 12 scattered pilots 11 are provided, which each occupy one subcarrier per OFDM symbol and whose subcarrier index k varies from one OFDM symbol to the next. The scattered pilots 11 can be described in the form p(n, k(n)) that is to say the subcarrier index k of the scattered pilots 11 is a function of the OFDM symbol index n. The scattered pilots 11 are in this case used for channel tracking, that is to say for continuously updating the channel estimate.

FIG. 5 shows a detail of the subcarrier occupancy illustrated in FIG. 4, for one block. The relative subcarrier index is in this case indicated with reference to the block start on the y axis, that is to say the first subcarrier in the block has the relative subcarrier index 0. As can be seen from FIG. 5, the subcarrier for each of the scattered pilots 11 increases by 5 subcarriers per time step, that is to say per OFDM symbol. The change in the subcarrier index of the respective pilot in this case governs the resolution of the sampling of the channel transfer function in the frequency direction. In this case, the greater the spread in time of the transmitted signal on the basis of the multiple path characteristic of the channel, the higher the sampling resolution must be in the frequency direction. If the subcarrier index changes by 5 subcarriers from one OFDM symbol to the next, then the channel parameters can be estimated sufficiently accurately approximately as far as a time spread of the received signal of 1/(5·312.5 kHz)=0.64 μs, which is adequate for most applications.

As can also be seen from FIG. 5, one specific subcarrier is occupied with a pilot symbol of a scattered pilot 11 with a specific repetition rate. In the present case, one specific subcarrier is occupied with a pilot symbol for every 7 OFDM symbols. The repeated occupancy of one specific subcarrier with one pilot symbol is necessary since the transmission channel is time-variant. The pilot symbols must therefore be retransmitted at a specific repetition rate per subcarrier for continuous channel estimation. If one pilot symbol is transmitted on one specific subcarrier with an overall symbol duration of 3.6 μs for all 7 OFDM symbols, the channel estimate based on this is sufficiently accurate up to a Doppler frequency spread (measure of the time variance of a transmission channel) of ½/(7·3.6 μs)=19.8 kHz.

This is, of course, dependent on the channel estimate for a specific subcarrier being updated as soon as a new pilot symbol has been received on this subcarrier. If, for example, the OFDM symbol with the symbol index n=8 is received, the channel parameters for the subcarrier with the index 40 are updated on the basis of the pilot symbol which occupies the subcarrier with the index 40; if the OFDM symbol with the symbol index n=9 is then received, the channel parameters for the subcarrier with the index 45 are updated on the basis of the pilot symbol which occupies the subcarrier with the index 45. Since, as can be seen from FIG. 4, 12 scattered pilots are in principle provided, the channel parameters for 12 subcarriers are in each case updated per OFDM symbol.

Since the Doppler frequency spread which actually occurs for typical WLAN applications is generally considerably less than 19.8 kHz (typically in the region of a few 100 Hz), it is feasible for the purposes of the invention for the channel parameters for the entire OFDM transmission band, that is to say for all the subcarriers, to be updated jointly (but with a resolution of 5 subcarriers) or for relatively large portions of the OFDM transmission band to be updated on a specific time pattern. In this case, the pilot symbols are temporarily stored between two such channel estimates. For example, as is illustrated in FIG. 5, a first update of the channel parameters for all of the subcarriers can be carried out at the time n=7, and a second update of the channel parameters for all the subcarriers can be carried out at the time n=14, that is to say the channel parameters are in each case updated for one group of 7 OFDM symbols. In this case, the channel transfer function in the frequency direction is in each case interpolated once again for a group comprising 7 OFDM symbols. The pilot symbols between two update times, that is to say for the times n=8 to n=13, must be temporarily stored for this purpose.

What is claimed is:

1. A method of generating a packet preamble for OFDM transmission, comprising:
   generating a plurality of OFDM preamble segments each of which comprises a plurality of sample values;
   grouping a first subset of the OFDM preamble segments into a first section of a first part of the packet preamble so that only identical OFDM preamble segments are included in the first section; and
   grouping a second subset of the OFDM preamble segments into a second section of the first part of the packet preamble so that some of the OFDM preamble segments included in the second section are non-identical and some of the OFDM preamble segments included in the second section are also included in the first section so that the first and second sections overlap.

2. The method of claim 1, comprising superimposing a sequence of identical segments and a mathematical sign sequence to generate the plurality of OFDM preamble segments.

3. The method of claim 2, wherein a first portion of the mathematical sign sequence comprises identical numerical values and a second portion of the mathematical sign sequence comprises different numerical values.

4. The method of claim 3, wherein the identical numerical values are +1 and the different numerical values are −1 and +1.

5. The method of claim 3, wherein the second portion of the mathematical sign sequence forms a Barker sequence.

6. The method of claim 5, wherein the Barker sequence has a length of 13.

7. The method of claim 6, wherein the mathematical sign sequence includes elements {1,1,1,1,1,1,1,1,1,1,−1,−1,1,1,−1,1,−1,1} and the last thirteen elements of the mathematical sign sequence together form the Barker sequence of length 13.

8. The method of claim 1, further comprising generating a second different part of the packet preamble.

9. The method of claim 8, wherein the second part of the packet preamble includes a plurality of preamble segments which are larger than the OFDM preamble segments included in the first part of the packet preamble.

10. The method of claim 1, wherein the OFDM preamble segments included in the first part of the packet preamble have a time duration of 0.4 μs.

11. The method of claim 1, wherein the packet preamble is a preamble of a WLAN packet.

* * * * *